(12) United States Patent
Itoh et al.

(10) Patent No.: US 10,464,756 B2
(45) Date of Patent: Nov. 5, 2019

(54) CONVEYING DEVICE AND CONVEYOR UNIT

(71) Applicant: ITOH DENKI CO., LTD., Kasai-shi, Hyogo (JP)

(72) Inventors: Kazuo Itoh, Kasai (JP); Tatsuhiko Nakamura, Hyogo (JP); Koji Ueda, Kakogawa (JP); Takahiro Itoh, Himeji (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 15/729,892

(22) Filed: Oct. 11, 2017

(65) Prior Publication Data

US 2018/0229937 A1    Aug. 16, 2018

(30) Foreign Application Priority Data

Feb. 10, 2017    (JP) .................................. 2017-023416

(51) Int. Cl.
| | | |
|---|---|---|
| *B65G 17/24* | (2006.01) | |
| *B65G 13/10* | (2006.01) | |
| *B65G 23/04* | (2006.01) | |
| *B65G 47/52* | (2006.01) | |
| *B65G 47/54* | (2006.01) | |
| *B65G 17/06* | (2006.01) | |

(Continued)

(52) U.S. Cl.
CPC ........... *B65G 17/24* (2013.01); *B65G 17/062* (2013.01); *B65G 17/48* (2013.01); *B65G 23/04* (2013.01);
(Continued)

(58) Field of Classification Search
CPC ....... B65G 17/062; B65G 17/48; B65G 35/02
(Continued)

(56) References Cited

U.S. PATENT DOCUMENTS 2,368,414 A * 1/1945 Eggleston ............ B65G 41/002
198/861.3
6,343,685 B1 * 2/2002 Hofer .................... B65G 47/53
198/370.09
(Continued)

FOREIGN PATENT DOCUMENTS

| GB | 2534982 A | 10/2016 |
|---|---|---|
| JP | 2012051680 A | 3/2012 |
| WO | WO-2015-129803 A1 | 9/2015 |

OTHER PUBLICATIONS

Search Report dated Apr. 9, 2018, in Application No. GB1716579.6.

*Primary Examiner* — Douglas A Hess
(74) *Attorney, Agent, or Firm* — Wood, Phillips, Katz, Clark & Mortimer

(57) ABSTRACT

A conveying device has: a main conveyor unit; a sub conveyor unit; and a lifting and lowering unit that lifts and lowers at least one of the main conveyor unit and the sub conveyor unit, wherein the main conveyor unit has a main conveying passage disposed in a fixed region, the main conveying passage conveying a conveyance object, wherein the sub conveyor unit has a sub conveying passage disposed in the fixed region, the sub conveying passage conveying the conveyance object in an intersecting direction with respect to a conveying direction of the main conveying passage, wherein a conveyance attitude is capable of being changed between a main conveyance attitude in which a conveying surface of the sub conveying passage is located below a conveying surface of the main conveying passage, and a sub conveyance attitude in which both ends in the intersecting direction of the conveying surface of the sub conveying passage are located above the conveying surface of the main conveying passage, and in the sub conveyance attitude, the conveying surface of the sub conveying passage is inclined in a height direction.

18 Claims, 12 Drawing Sheets

(51) Int. Cl.
*B65G 17/48* (2006.01)
*B65G 35/02* (2006.01)
*B65G 47/64* (2006.01)

(52) U.S. Cl.
CPC ............. *B65G 35/02* (2013.01); *B65G 47/54* (2013.01); *B65G 47/647* (2013.01)

(58) Field of Classification Search
USPC .... 198/370.1, 407, 412, 570, 575, 578, 584, 198/589, 861.2
See application file for complete search history.

(56) References Cited

U.S. PATENT DOCUMENTS

| | | | |
|---|---|---|---|
| 7,287,636 B2 * | 10/2007 | Itoh | B65G 23/08 198/370.1 |
| 7,584,834 B2 * | 9/2009 | Wood | B65G 37/00 198/312 |
| 7,614,491 B2 * | 11/2009 | Alesi | B65G 47/52 198/370.12 |
| 7,770,720 B2 * | 8/2010 | Freudelsperger | B65G 21/00 198/583 |
| 8,322,515 B2 * | 12/2012 | Rausch | B65G 47/681 198/436 |
| 8,622,199 B2 * | 1/2014 | Windfeld | B65G 41/005 198/588 |
| 9,038,810 B2 * | 5/2015 | Schroader | B65G 47/22 198/413 |
| 9,199,505 B2 * | 12/2015 | Mueller | B42C 11/04 |
| 9,670,002 B2 * | 6/2017 | Kato | B65G 35/06 |
| 10,053,300 B2 * | 8/2018 | Itoh | B65G 47/54 |
| 2012/0048678 A1 | 3/2012 | Itoh et al. | |

\* cited by examiner

MAIN CONVEYANCE ATTITUDE

SUB CONVEYANCE ATTITUDE

MAIN CONVEYANCE ATTITUDE

SUB CONVEYANCE ATTITUDE

CONVEYING DEVICE AND CONVEYOR UNIT

TECHNICAL FIELD

The present invention relates to a conveying device that constitutes a part of a conveyor line. Particularly, the present invention relates to a conveying device capable of changing an article conveying direction in an intersecting direction with respect to a carrying-in direction. Additionally, the present invention relates to a conveyor unit including conveyor lines constructed in multiple stages.

BACKGROUND ART

In a distribution site such as a product assembly line and an article delivery center, a conveyor line is conventionally utilized for conveyance of articles. Recently, in the distribution site, conveyor lines are three-dimensionally assembled with diversification of conveyed places of articles, and sorting is sometimes performed between conveyor lines having a height difference (for example, Patent Document 1).

Patent Document 1 discloses a conveyor device having a higher-level side conveyor line and a lower-level side conveyor line having a height difference, and a connection conveyor line branched from the middle of the lower-level side conveyor line and inclined upward toward the higher-level side conveyor line. In this conveyor device of Patent Document 1, a conveying device including a main conveying passage for conveying its own conveyor line, and a sub conveying passage for performing conveyance to the connection conveyor line is provided in a branching part of the lower-level side conveyor line and the connection conveyor line. In this conveying device, a first end side of the sub conveying passage is axially supported, and a second end side is rotated to be brought into an inclined attitude, so that a part on the second end side is located at a higher position than the main conveying passage, and an article passes the sub conveying passage to be conveyed to the connection conveyor line side, and is guided to the higher-level side conveyor line. Therefore, according to the conveyor device disclosed in Patent Document 1, it is possible to perform sorting of an article conveyor line from the lower-level side conveyor line to the higher-level side conveyor line.

PRIOR ART DOCUMENT

Patent Document

Patent Document 1: WO 2015/129803 A

DISCLOSURE OF INVENTION

Technical Problem

However, in the conveying device disclosed in Patent Document 1, in the sub conveying passage, a single shaft rotates, and the axially supported first end side of the sub conveying passage is located on a lower side of the main conveying passage. Therefore, in a case where an article is conveyed from the higher-level side conveyor line to the lower-level side conveyor line, a part of the article sometimes comes into contact with a conveying surface of the main conveying passage. As a result, the article is caught by the conveying surface of the main conveying passage, and a problem that accurate conveyance cannot be performed depending on the article occurs.

An object of the present invention is to provide a conveying device and a conveyor unit capable of preventing a conveyance object from being caught by the conveying surface of the main conveying passage in a case where the conveyance object passes the sub conveying passage.

Solution to Problem

An aspect of the present invention for solving the above problem is a conveying device including: a main conveyor unit; a sub conveyor unit; and a lifting and lowering unit that lifts and lowers at least one of the main conveyor unit and the sub conveyor unit, wherein the main conveyor unit includes a main conveying passage disposed in a fixed region, the main conveying passage conveying a conveyance object, wherein the sub conveyor unit includes a sub conveying passage disposed in the fixed region, the sub conveying passage conveying the conveyance object in an intersecting direction with respect to a conveying direction of the main conveying passage, wherein a conveyance attitude is changeable between a main conveyance attitude in which a conveying surface of the sub conveying passage is located below a conveying surface of the main conveying passage, and a sub conveyance attitude in which both ends in the intersecting direction of the conveying surface of the sub conveying passage are located above the conveying surface of the main conveying passage, and wherein in the sub conveyance attitude, the conveying surface of the sub conveying passage is inclined in a height direction.

The "conveying surface" mentioned herein includes not only a placement surface where a conveyance object is placed, but also a virtual surface which a bottom of the conveyance object passes. For example, in a case of a belt conveyor, the conveying surface is a surface on a belt. In a case of a roller conveyor, the conveying surface is a virtual surface that is obtained by connecting contact portions with a conveyance object of rollers during conveyance, and is generally a virtual surface that passes respective uppermost parts of the rollers.

In the conveying device of this aspect, conveyor lines are constructed in multiple stages, and the conveying device is suitably used as a part of a conveyor unit having a height difference. For example, the conveying device of this aspect is used for application of transferring a conveyance object from a higher-level side conveyor line to a lower-level side conveyor line.

According to this aspect, the conveyance attitude is brought into the main conveyance attitude, so that the conveying surface of the sub conveying passage is located on a lower side with respect to the conveying surface of the main conveying passage, and therefore a conveyance object on a higher-level conveyor line passes through on the conveying surface of the main conveying passage, thus passing through on the higher-level conveyor line as it is.

On the other hand, according to this aspect, the conveyance attitude is brought into the sub conveyance attitude, so that both the ends of the conveying surface of the sub conveying passage are located above the conveying surface of the main conveying passage, and furthermore are inclined in the height direction. Therefore, the conveying surface of the sub conveying passage and the connection line are disposed such that an inclination angle of the conveying surface of the sub conveying passage, and an inclined angle of the connection line that connects the higher-level side conveyor line and the lower-level side conveyor line are aligned, so that a relative angle of the conveying surface of the sub conveying passage and the connection line is reduced. As a result, the conveyance object can be transferred from the conveying surface of the sub conveying passage to the connection line and from the connection line to the conveying surface of the sub conveying passage with no resistance.

According to this aspect, in the sub conveyance attitude, both the ends of the conveying surface of the sub conveying passage are located above the conveying surface of the main conveying passage, and therefore it is possible to prevent the conveyance object from being caught by the conveying surface of the main conveying passage, and it is possible to more accurately convey the conveyance object to a desired conveyor line.

According to a preferable aspect, in the sub conveyance attitude, substantially a whole of the conveying surface of the main conveying passage is located below the conveying surface of the sub conveying passage.

The "substantially a whole of the conveying surface" mentioned herein is a region which is at least 95% of the conveying surface.

According to this aspect, it is possible to more reliably prevent the conveyance object from being caught by the conveying surface of the main conveying passage.

According to a preferable aspect, the lifting and lowering unit includes at least two kinds of cam members changing the conveyance attitude from the main conveyance attitude to the sub conveyance attitude by rotation thereof.

According to this aspect, the two kinds of cam members having different shapes and sizes are provided, and the conveyance attitude is changed from the main conveyance attitude to the sub conveyance attitude with rotation of these two kinds of cam members, and therefore it is possible to incline the sub conveying surface of the sub conveying passage with a simple mechanism.

According to a more preferable aspect, the lifting and lowering unit includes a connecting member connecting the two kinds of cam members directly or through another member, the connecting member allowing a synchronizing rotation of the two kinds of cam members to change the conveyance attitude from the main conveyance attitude to the sub conveyance attitude.

According to this aspect, the two kinds of cam members are synchronized to be rotated, and therefore a single power source can rotate both the cam members.

In the above aspect, the cam members are preferably plane cams.

According to a preferable aspect, the lifting and lowering unit includes a driving source that lifts and lowers one of the main conveyor unit and the sub conveyor unit, driving of the driving source changing the conveyance attitude from the main conveyance attitude to the sub conveyance attitude.

According to this aspect, attitude change is easy.

According to a more preferable aspect, the driving source is a motor-incorporating roller including a motor and a speed reducer therein.

According to this aspect, it is possible to attain space saving.

According to a preferable aspect, the conveying device includes an angle adjusting unit adjusting an inclination angle of the slab conveying passage in the sub conveyance attitude.

According to this aspect, it is possible to reduce a relative angle of the conveying surface of the sub conveying passage relative to the connection line.

According to a preferable aspect, the lifting and lowering unit includes a base part directly or indirectly fixed to a floor or a fixed structure, the base part being connected to a part of the sub conveyor unit to regulate movement of the sub conveying passage in the conveying direction of the main conveying passage.

According to this aspect, the sub conveying passage is unlikely to shift in the conveying direction during conveyance, and it is possible to more accurately control conveyance.

According to one aspect of the present invention, a conveyor unit including: at least two conveyor lines having a height difference; and a connection line connecting the two conveyor lines, wherein at least one of the two conveyor lines includes the conveying device in a connection portion to the connection line.

According to this aspect, it is possible to prevent the conveyance object from being caught by the conveying surface of the main conveying passage, and it is possible to more accurately convey the conveyance object.

According to one aspect of the present invention, a conveyor unit including: a conveyor line; and an inclined line inclined in a height direction, wherein one of ends of the inclined line is connected to an intermediate part of the conveyor line, and wherein the conveyor line includes the conveying device in a connection portion to the inclined line.

The "intermediate part" mentioned herein is a portion between both ends in one direction (portion on a central side), and is also a portion other than the ends.

According to this aspect, it is possible to prevent the conveyance object from being caught by the conveying surface of the main conveying passage, and it is possible to more accurately convey the conveyance object.

Effect of Invention

A conveying device and a conveyor unit of the present invention can prevent a conveyance object from being caught by a main conveying passage in a case where the conveyance object passes a sub conveying passage.

BRIEF DESCRIPTION OF DRAWINGS

FIGS. 10A to 10C are explanatory views illustrating operation performed when a conveyance object is transferred from a higher-level side conveyor line to a connection conveyor line in the conveyor unit of FIG. 1, wherein FIGS. 10A to 10C illustrate attitudes of respective members in a time-sequential order.

FIGS. 11A to 11C are explanatory views illustrating operation performed when the conveyance object is transferred from the connection conveyor line to the lower-level side conveyor line in the conveyor unit of FIG. 1, wherein FIGS. 11A to 11C illustrate the attitudes of the respective members in a time-sequential order.

FIGS. 12A and 12B are explanatory views of the conveyor unit of FIG. 1, wherein FIG. 12A is a side view illustrating a main conveyance attitude, and FIG. 12B is a side view illustrating a sub conveyance attitude.

FIGS. 13A and 13B are explanatory views of the conveyor unit of FIG. 1, wherein FIG. 13A is a side view illustrating positional relation of rollers in the main conveyance attitude, and FIG. 13B is a side view illustrating positional relation of the rollers in the sub conveyance attitude.

FIGS. 14A to 14C are explanatory views illustrating operation performed when a conveyance object is transferred from a higher-level side conveyor line to a connection conveyor line in a conveyor unit of another embodiment of the present invention, wherein FIGS. 14A to 14C illustrate attitudes of respective members in a time-sequential order.

BEST MODE FOR CARRYING OUT THE INVENTION

Hereinafter, conveyor units 1 of embodiments of the present invention will be described.

Figure 1:
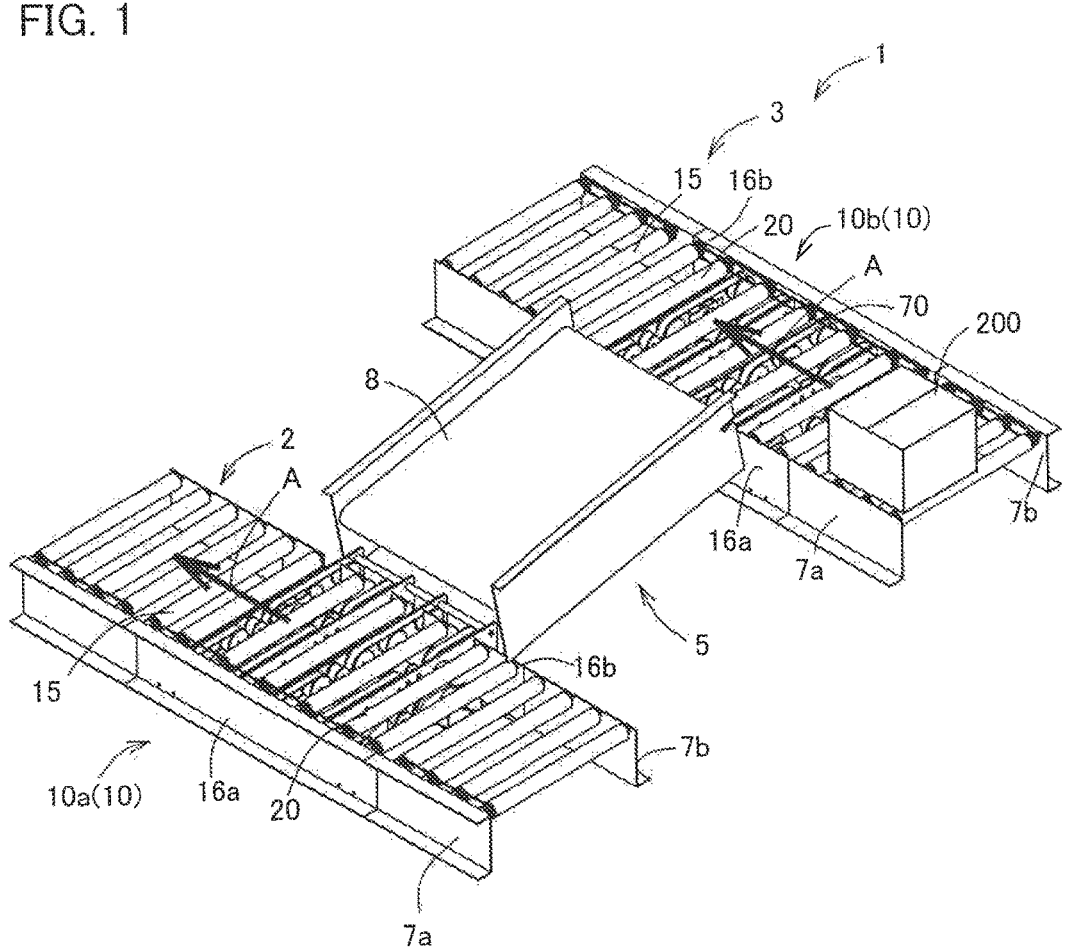
FIG. 1 is a perspective view of a conveyor unit of an embodiment of the present invention.

As illustrated in FIG. 1, a conveyor unit 1 of a first embodiment of the present invention includes: two conveyor lines 2, 3 having different heights of conveyance positions for a conveyance object 200; and a connection conveyor line 5 (connection line) that connects the conveyor lines 2, 3.

In the conveyor unit 1 of this embodiment, respective conveying devices 10 (10a, 10b), which have a characteristic structure, are provided in a connection portion of the lower-level side conveyor line 2 and the connection conveyor line 5, and in a connection portion of the higher-level side conveyor line 3 and the connection conveyor line 5. That is, in the conveyor unit 1 of this embodiment, when the conveyance object 200 passes through on the conveying devices 10, attitudes of the conveying devices 10 are changed, so as to convey the conveyance object 200 onto a desired conveyor line 2, 3, 5.

Figure 12A:
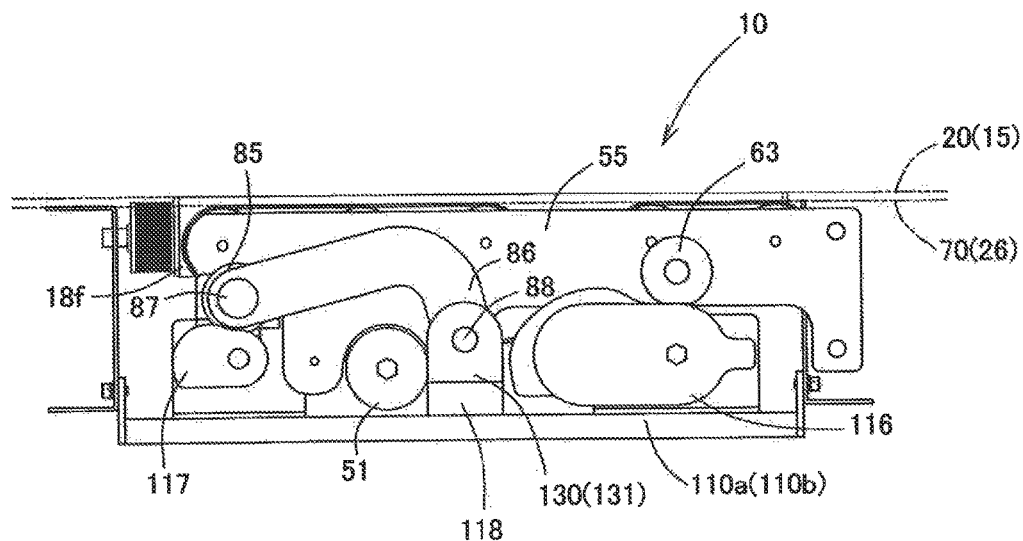
Figure 12B:
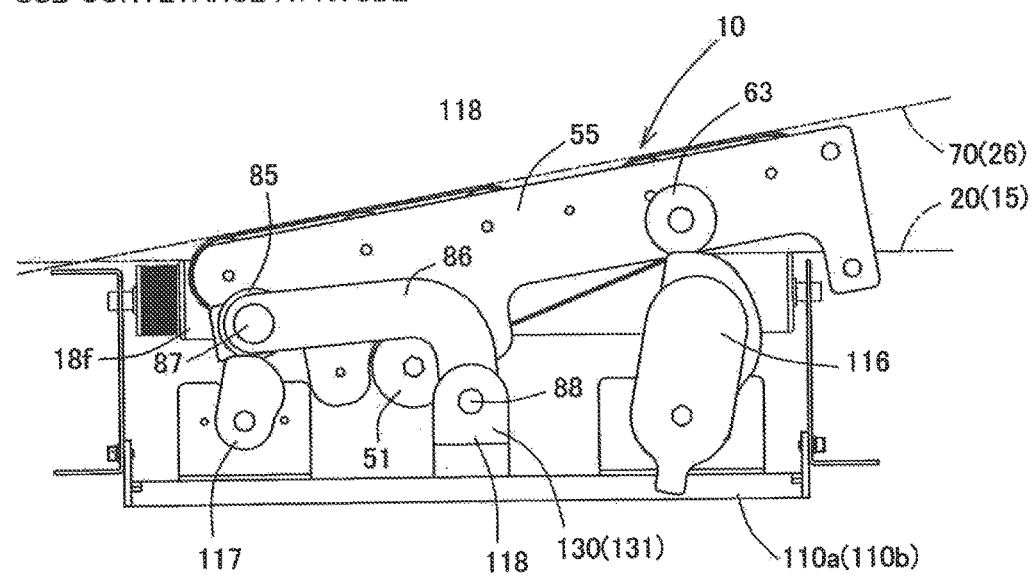

For example, in a case where main conveyance operation for conveying the conveyance object 200 onto the conveyor line 3 as it is so as to convey the conveyance object 200 to a downstream side, is performed, the conveying device 10 is brought into a main conveyance attitude illustrated in FIG. 12A, so that the conveyance object 200 can be conveyed as it is. On the other hand, in a case where sub conveyance operation for conveying the conveyance object 200 flowing onto the conveyor line 3 to another conveyor line 2 is performed, the conveying device 10 is brought into a sub conveyance attitude illustrated in FIG. 12B so that the conveyance object 200 can be conveyed to the conveyor line 2.

Hereinafter, based on the above characteristics, the conveyor unit 1 will be described in detail.

As illustrated in FIG. 1, the lower-level side conveyor line 2 is a conveyor line installed at a lower level, and conveys the conveyance object 200 in the predetermined direction (hereinafter, also referred to as the conveying direction A).

The higher-level side conveyor line 3 is a conveyor line installed at a higher level, which is higher than the lower-level side conveyor line 2, and a main conveying surface 20 of a conveying surface of the higher-level side conveyor line 3 is located at a higher position than a main conveying surface 20 of a conveying surface of the lower-level side conveyor line 2.

The higher-level side conveyor line 3 conveys the conveyance object 200 in the predetermined direction. In this embodiment, the conveyance object 200 is conveyed in the same direction as the conveying direction A of the lower-level side conveyor line 2.

As illustrated in FIG. 1, the conveyor lines 2, 3 each are a roller conveyor device, and provided with a plurality of rollers between two frame members 7a, 7b disposed in parallel.

Some of the rollers constituting each of the conveyor lines 2, 3 are motor-incorporating rollers, each of which incorporates a motor and a speed reducer in a roller body, and the roller body can be rotated by supplying power to the motor.

On the other hand, remaining rollers constituting the conveyor lines 2, 3 are follower rollers, and respective belts are suspended between the above motor-incorporating rollers and the follower rollers, and receive power transmission from the motor-incorporating rollers to be rotated. Each of the conveyor lines 2, 3 is divided into a plurality of zones in the conveying direction A, and traveling and stop can be performed for each zone.

The connection conveyor line 5 is a connection line that is branched from midstream in the conveying direction A of each of the conveyor lines 2, 3 to connect the conveyor lines 2, 3, and is also an inclined line that is installed in an inclined attitude in which a conveying surface 8 is inclined in the height direction.

More specifically, the connection conveyor line 5 is a belt conveyor, in which a conveyor belt is suspended between at least two rollers, and the conveying surface 8 is formed on the conveyor belt.

The conveying devices 10 (10a, 10b) are sorting devices that switch the respective conveying directions of the conveyor lines 2, 3.

The conveying devices 10a, 10b of this embodiment employ the same devices. Therefore, in the following description, the same constitutions of the conveying devices 10a, 10b will be described as the conveying devices 10.

Figure 2:
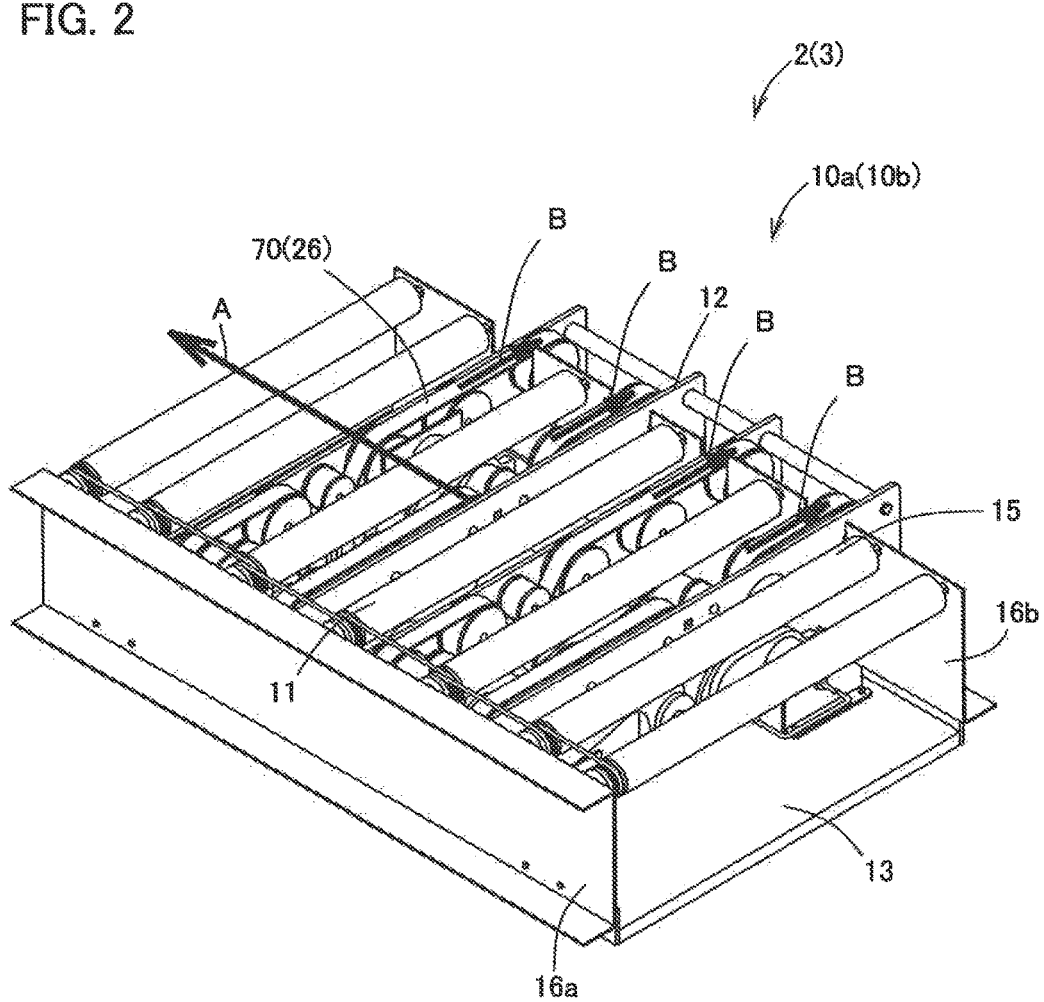
FIG. 2 is a perspective view of a conveying device of the embodiment of the present invention.
Figure 4:
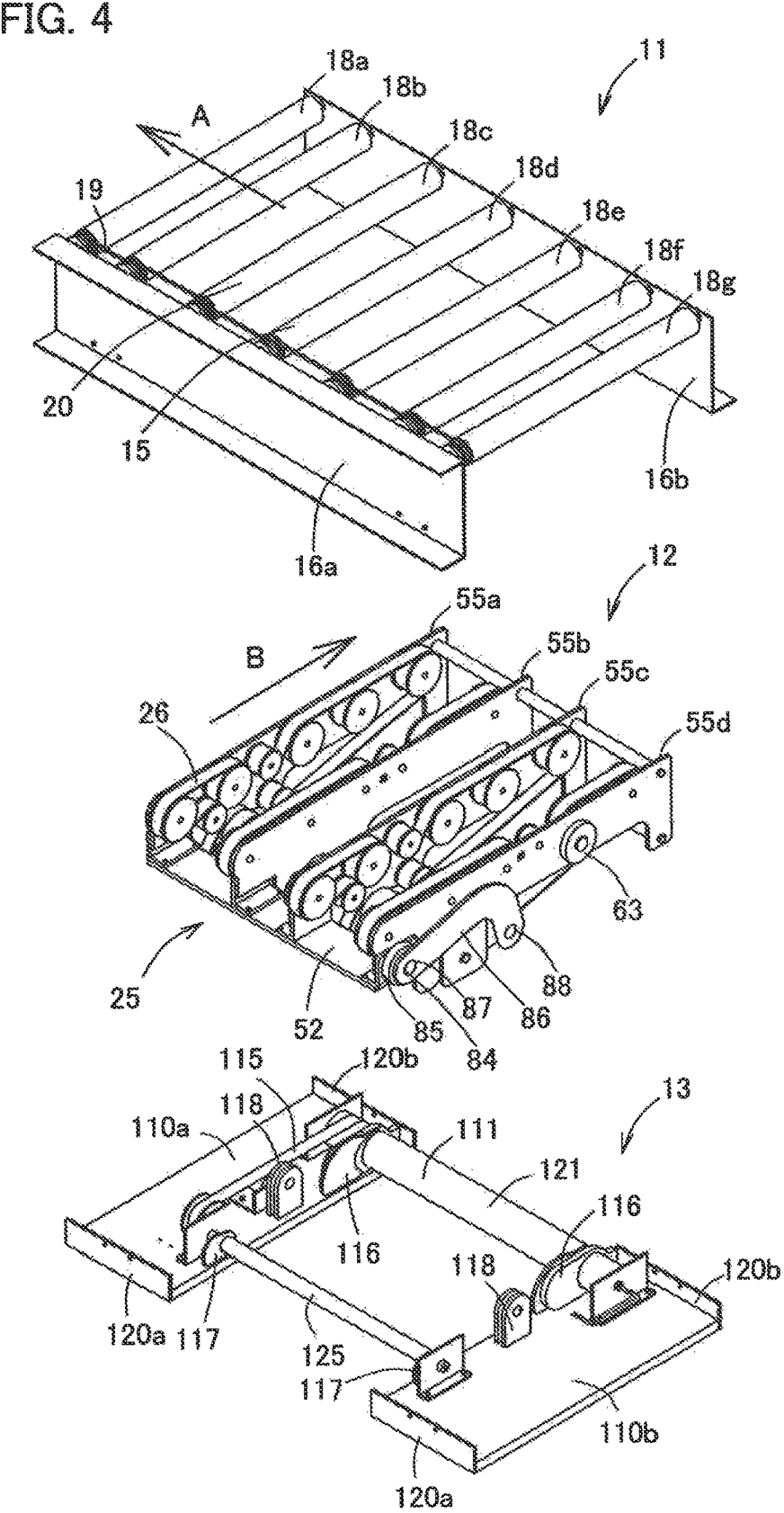
FIG. 4 is an exploded perspective view of the conveying device of FIG. 2.

As can be seen from FIG. 2 and FIG. 4, the conveying devices 10 each have a main conveyor unit 11, a sub conveyor unit 12, and a base part 13 (lifting and lowering unit) as main components.

The main conveyor unit 11 is composed of a roller conveyor similar to other conveyor portions of the conveyor lines 2, 3, and constitutes a main conveying passage 15 together with other roller conveyor adjacent in the conveying direction A.

As illustrated in FIG. 4, the main conveyor unit 11 includes main conveyance side frame members 16a, 16b, a plurality of rollers 18a to 18g, and a belt 19.

The main conveyance side frame members 16a, 16b partially constitute the frame members 7a, 7b, respectively, and are supporting members that support respective ends of the rollers 18a to 18g.

The main conveyance side frame members 16a, 16b are provided at a predetermined interval so as to face each other with the rollers 18a to 18g disposed therebetween.

The rollers 18a to 18g are conveying rollers that constitute a part of the main conveying passage 15.

The rollers 18a to 18g are arrayed at constant intervals in the conveying direction A between the main conveyance side frame members 16a, 16b, and the main conveyance side frame members 16a, 16b axially support body portions such that the body portions are rotatable in the same direction.

The roller 18d located on a central side among the rollers 18a to 18g is a motor-incorporating roller, and the remaining rollers 18a to 18c and 18e to 18g are follower rollers.

The belt 19 is suspended between the follower rollers 18a to 18c and 18e to 18g, and the motor-incorporating roller 18d, and the follower rollers 18a to 18c and 18e to 18g receive power transmission from the motor-incorporating roller 18d to be rotatable. Any roller among the rollers 18a to 18g may be the motor-incorporating roller.

In the main conveyor unit 11, the conveyance object 200 can be conveyed in the conveying direction A by the main conveying passage 15. The conveying direction A of this conveyance object 200 may be the opposite direction.

In the main conveyor unit 11, as can be seen from FIG. 4 and FIG. 12A, the heights of uppermost parts of the rollers 18a to 18g coincide with each other, the uppermost parts (tops) of the rollers 18a to 18g form the main conveying surface 20. That is, the main conveying surface 20 is a virtual surface formed by connecting the tops of the rollers 18a to 18g, and is also a virtual surface which a bottom of the conveyance object 200 passes.

Figure 5:
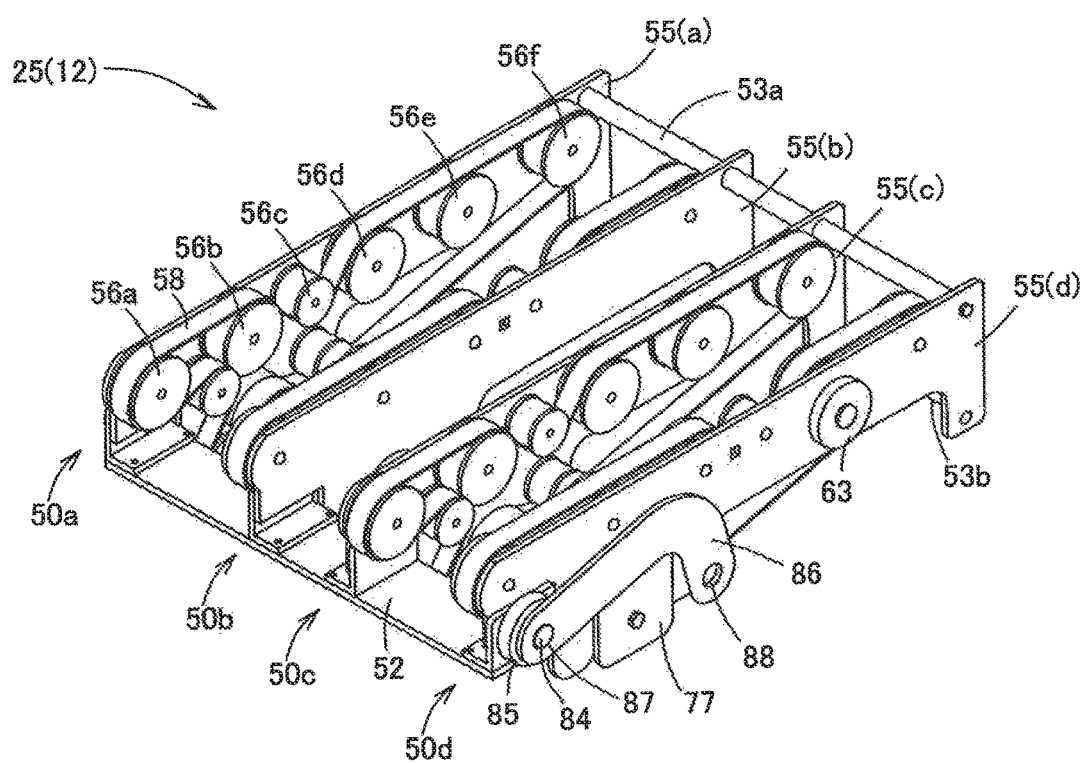
FIG. 5 is a perspective view of a sub conveyor unit of FIG. 4.

The sub conveyor unit 12 is a portion that conveys the conveyance object 200 to the connection conveyor line 5 side, and includes a conveyor group 25 as illustrated in FIG. 5.

The conveyor group 25 is a narrow conveyor group that constitutes a sub conveying passage 26.

Figure 6:
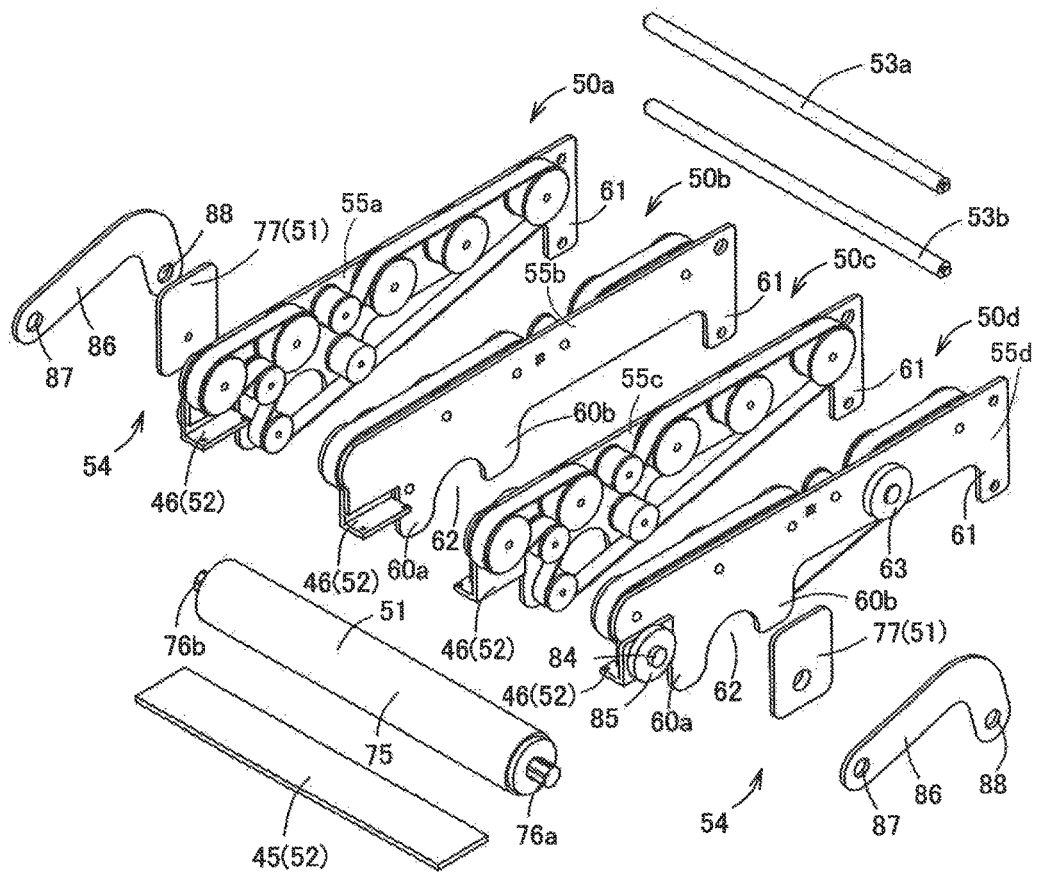
FIG. 6 is an exploded perspective view of the sub conveyor unit of FIG. 4.

As illustrated in FIG. 6, the conveyor group 25 includes a plurality of conveyors 50a to 50d, a conveying motor-incorporating roller 51 (driving source), connecting frames 52, 53a, 53b, and swinging units 54.

Figure 8:
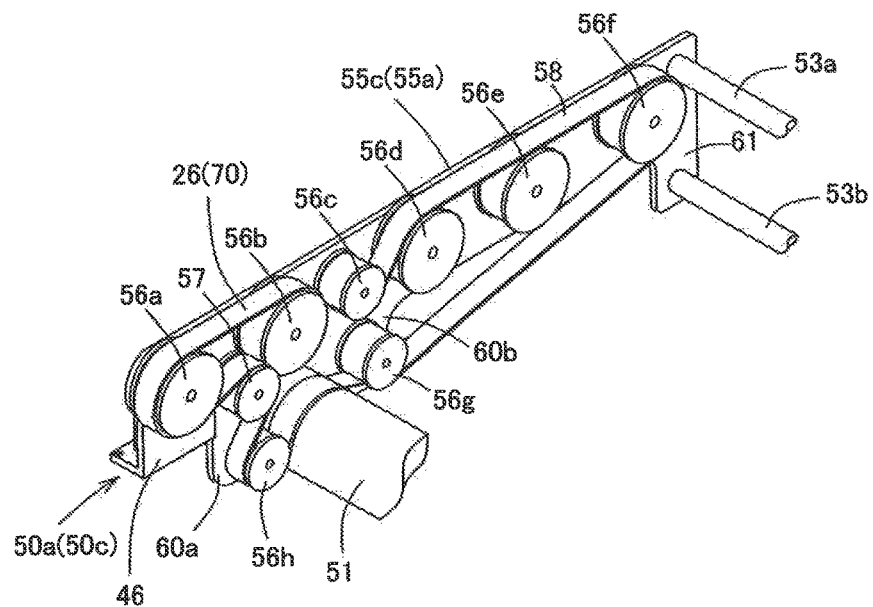
FIG. 8 is a perspective view of the conveyor of FIG. 2.

The conveyors 50a to 50d each are a narrow conveyor, and each include plate-like members 55 (55a to 55d), a plurality of pulleys 56a to 56h, a tension pulley 57, and a belt 58, as illustrated in FIG. 8.

The plate-like members 55 (55a to 55d) each are a plate-like body that supports the pulleys 56a to 56h, 57 in a cantilever form, and each extend in the conveying direction B (refer to FIG. 4) in a belt shape.

Figure 7:
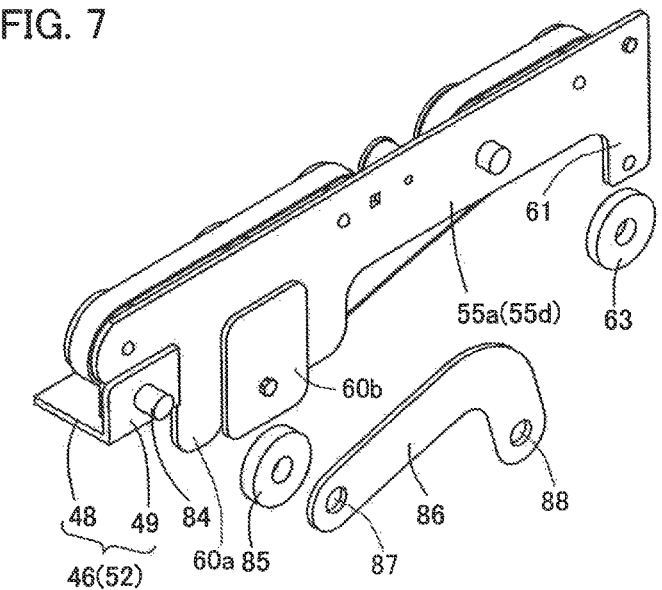
FIG. 7 is an exploded perspective view of the conveyor of FIG. 4.

As illustrated in FIG. 6 and FIG. 7, in each plate-like member 55, protruding parts 60a, 60b, 61 that protrude downward are provided on an intermediate part and one end of a lower part.

A pair of the protruding parts 60a, 60b provided in the intermediate part in the longitudinal direction of the plate-like member 55 is disposed at a predetermined longitudinal interval. From another viewpoint, the plate-like member 55 is provided with a cutout 62 interposed between the protruding parts 60a, 60b.

The cutout 62 is an arcuate cutout having an arc on an upper side, and enables passing of a roller body 75 of the conveying motor-incorporating roller 51.

The plate-like members 55 are fixed at constant intervals in vertical attitudes by the connecting frames 52, 53a, 53b.

The plate-like members 55a, 55d located both outsides in the parallel arrangement direction of the conveyors 50a to 50d are provided with respective short rollers 63, 63.

The short rollers 63, 63 are members that function as cam followers, and that function as contactors receiving respective first earn members 116, 116 of the base part 13.

The short rollers 63, 63 are mounted such that respective rotating shafts are directed in the thickness directions of the plate-like members 55a, 55d.

As illustrated in FIG. 8, the pulleys 56a to 56h are members that suspend and move the belt 58, and each are freely turnable.

In the pulleys 56a to 56h, the six pulleys 56a to 56f are provided in a row on an upper surface side of each of the plate-like members 55, and the remaining two pulleys 56g, 56h are provided in the protruding parts 60a, 60b of each of the plate-like members 55 on the lower side, respectively.

The perspective view of FIG. 8 illustrates the conveyors 50a, 50c. As for the conveyors 50b, 50d, the pulleys 56a to 56f are mounted on the opposite sides of the plate-like members 55.

The belt 58 is suspended on the tension pulley 57 together with the pulleys 56a to 56h, and the tension pulley 57 is a tension applying member that presses a portion not forming, sub conveying surface 70 in the belt 58 to apply tension to the belt 58.

The belt 58 is a connecting belt that connects the pulleys 56a to 56h, and the roller body 75 of the conveying motor-incorporating roller 51.

The belt 58 of this embodiment is a toothed belt, and all the conveyors 50a to 50d can cause the respective belts 58 to travel when the conveying motor-incorporating roller 51 is rotated.

In the conveyors 50a to 50d of this embodiment, as illustrated in FIG. 8, the eight pulleys 56a to 56h are mounted in each of the plate-like members 55a to 55d, and the six pulleys 56a to 56f among the eight pulleys are provided at an upper position.

Upper parts of the pulleys 56a, 56b, 56d, 56e, 56f among these six pulleys 56a to 56f are engaged with the belt 58, and the belt 58 is suspended on a lower side of the pulley 56c located at the intermediate part. Furthermore, the tension pulley 57 is provided between the pulleys 56f, 56g, and the belt 58 is suspended on an upper side of the tension pulley 57.

The reason for this is to apply appropriate tension to the belt 58 on the sub conveying passage 26 (sub conveying surface 70).

The respective pulleys 56c and the respective belts 58 of the conveyors 50a to 50d form the sub conveying passage 26, and the uppermost parts thereof form the sub conveying surface 70 as the conveying surface. That is, the heights of the uppermost part of the pulley 56c and the uppermost parts of the belt 58 of each of the conveyors 50a to 50d coincide with each other as illustrated in FIG. 13, and the uppermost parts of the pulleys 56c and the belts 58 form the sub conveying surface 70.

The sub conveying passage 26 is a conveying passage for conveying the conveyance object 200 as an article in the predetermined direction (hereinafter, also referred to as the conveying direction B). As illustrated in FIG. 2, the conveying direction B in the sub conveying passage 26 intersects with (is orthogonal to) the conveying direction A of the main conveying passage 15 of the main conveyor unit 11 in plan view. The sub conveying passage 26 and main conveying passage 15 overlap as seen viewing the conveying device from above. The conveying direction B may be the opposite direction.

The conveying motor-incorporating roller 51 (driving source) is suspended by the respective belts 58 of the conveyors 50a to 50d, and is a member that serves as a power source of the conveyors 50a to 50d.

As illustrated in FIG. 6, the conveying motor-incorporating roller 51 has the roller body 75 including a motor and a speed reducer therein, shaft parts 76a, 76b that rotate relatively to the roller body 75, and fixing plates 77, 77. That is, in the conveying motor-incorporating roller 51, the shaft parts 76a, 76b located both ends are fixed to the plate-like members 55a, 55d of the conveyors 50a, 50d through the fixing plates 77, 77, respectively, and the roller body 75 rotates when the motor (not illustrated) is energized.

The fixing plates 77, 77 are mounted on outer surfaces of the plate-like members 55a, 55d so as to cover the cutouts 62. That is, the fixing plates 77, 77 are mounted on surfaces opposite to the pulleys 56a to 56h of the plate-like members 55a, 55d.

The connecting frames 52, 53a, 53b each are a connecting frame that connects the conveyors 50a to 50d in an attitude in which the conveyors 50a to 50d are parallel to each other.

The connecting frame 52 is a frame that connects respective one ends of the plate-like members 55 of the conveyors 50a to 50d, and includes a connecting plate 45, and mounting parts 46.

The connecting plate 45 is a plate-like body that extends in the parallel arrangement direction of the conveyors 50a to 50d.

The mounting parts 46 are portions where the plate-like members 55a to 55d can be mounted.

As illustrated in FIG. 7, the mounting parts 46 each have an L-shaped cross-section, and each include a first plate part 48 that is connected to the connecting plate 45, and a second plate part 49 that rises from an end of the first plate part 48.

The connecting frames 53a, 53b each connect the other ends (ends on the protruding part 61 side) of the respective plate-like members 55 of the conveyors 50a to 50d, and each are a rod body that extends in the parallel arrangement direction of the conveyors 50a to 50d.

The connecting frame 53b is provided in the protruding parts 61, and the connecting frame 53a is provided above the connecting frame 53b.

As illustrated in FIG. 7, the swinging units 54 each include a shaft member 84, a short roller 85, and a connecting member 86.

The shaft member 84 is a member fixed to the second plate part 49 in an upright attitude, and is also a member that axially rotatably supports the short roller 85, and fixes the connecting member 86 to the plate-like member 55a (plate-like member 55d).

The short roller 85 is a member that functions as a cam follower, and that functions as a contactor receiving a cam member 117.

The shaft member 84 is mounted on the second plate part 49 so as to be directed in the thickness direction of the plate-like member 55, and extends in the same direction of a rotating axis of the short roller 85.

The connecting member 86 is a plate-like body that connects the conveyors 50a to 50d to the base part 13.

The connecting member 86 linearly extends or is partially bent to extend. One end in the longitudinal direction (inclined direction) of the connecting member includes a first fixing part 87 that can be fixed to the connecting frame 52, and the other end includes a second fixing part 88 that can be fixed to a fixing part 118 of the base part 13.

The first fixing parts 87 of this embodiment are through holes or bottomed holes mountable with the shaft members 84, 84, and the second fixing parts 88 are insertion holes that enable insertion of fastening elements.

The base part 13 (lifting and lowering unit) is a portion that serves as a foundation of the conveyor unit 11, 12, and is also a portion that forms a lifting and lowering device that lifts and lowers the sub conveyor unit 12 with respect to the main conveyor unit 11.

Figure 9:
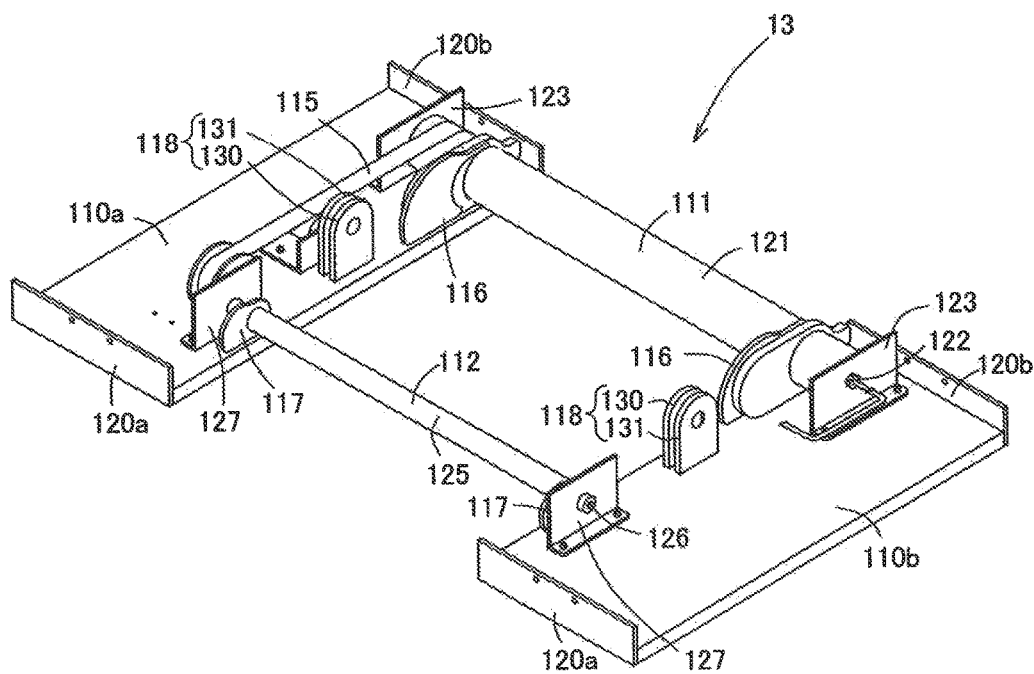
FIG. 9 is a perspective view of a base part of FIG. 2.

As illustrated in FIG. 9, the base part 13 includes base bodies 110a, 110b, rollers 111, 112, a belt 115, two kinds of cam members 116, 117, and the fixing parts 118.

The base bodies 110a, 110b are portions that are directly or indirectly fixed to a floor or a fixed structure, and that serve as foundations.

The base bodies 110a, 110b each have a long plate shape, and include support parts 120a, 120b rising upward in both longitudinal ends of the base bodies 110a, 110b, respectively.

The support parts 120a, 120b are portions that support the main conveyance side frame members 16a, 16b, respectively.

The roller 111 is a lifting and lowering motor-incorporating roller, and has a roller body 121 including a motor and a speed reducer therein, shaft parts 122, 122 that rotate relative to the roller body 121, and fixing plates 123, 123, as illustrated in FIG. 9.

That is, in the lifting and lowering motor-incorporating roller 111 (driving source, angle adjusting unit), the shaft parts 122, 122 located at both ends are axially supported by the fixing plates 123, 123, and the roller body 121 rotates when the motor is energized, with the capability of controlling rotational speed or a rotation angle.

The roller 112 is a follower roller that rotates by following the lifting and lowering motor-incorporating roller 111, and includes a roller body 125, shaft parts 126, 126 that are rotatable relative to the roller body 125, and fixing plates 127, 127. In the follower roller 112, the shaft parts 126, 126 located both ends are axially supported by the respective fixing plates 127, 127.

The belt 115 is a connecting belt that is suspended between the roller bodies 121, 125 of the rollers 111, 112 and that synchronizes the roller bodies 121, 125, and is also a power transmission member that transmits rotational force of the lifting and lowering motor-incorporating roller 111 to the follower roller 112. That is, when the lifting and lowering motor-incorporating roller 111 rotates, the belt 115 causes the follower roller 112 to synchronize to rotate.

The belt 115 connects portions outside the cam members 116, 117 of the roller bodies 121, 125.

The first cam members 116 are involute cams having involute shaped cam surfaces. That is, peripheral surfaces of the first cam members 116 form involute curved surfaces.

The first cam members 116 are mounted near both ends in the longitudinal direction of the roller body 121 of the lifting and lowering motor-incorporating roller 111. Additionally, when the motor (not illustrated) inside the lifting and lowering motor-incorporating roller 111 is energized, the first cam members 116 rotate integrally with the roller body 121.

The second cam members 117 are involute cams having involute shaped cam surfaces. That is, peripheral surfaces of the second cam members 117 form involute curved surfaces.

The second cam members 117 are mounted on both ends of the roller body 125 of the follower roller 112. Additionally, when the motor (not illustrated) inside the lifting and lowering motor-incorporating roller 111 is energized, the roller body 125 of the follower roller 112 rotates integrally with the roller body 121 of the lifting and lowering motor-incorporating roller 111 through the belt 115, and the second cam members 117 also rotate with the above rotation.

The fixing parts 118 each are a portion where the connecting member 86 of the swinging unit 54 can be fixed, and each are composed of a pair of fixing pieces 130, 131. The fixing parts 118 are provided in inner ends in the short direction at intermediate parts in the longitudinal directions of the base bodies 110a, 110b.

The fixing pieces 130, 131 are plate-like pieces protruding upward from the base bodies 110a, 110b, and ends in the protruding directions are arcuate.

The fixing pieces 130, 131 are separated in the conveying direction A, and can sandwich each connecting member 86 therebetween. That is, the fixing pieces 130, 131 sandwich the connecting member 86 in the thickness direction therebetween, so that it is possible to regulate movement of the connecting member 86 in the parallel arrangement direction.

The fixing pieces 130, 131 each include a fastening hole that penetrates in the thickness direction, and each fastening element is inserted into the fastening hole and the second fixing part 8$, so that it is possible to fix the fixing pieces 130, 131 to the second fixing part 88 of the connecting member 86. That is, in the fixing pieces 130, 131, the fastening element can regulate movement of the connecting member 86 in the overlapping direction.

Next, positional relation of each member of the conveyor unit 1 of this embodiment will be described. In order to facilitate understanding, a state of a main conveyance attitude in which the conveyance object 200 is allowed to pass the main conveying passage 15 will be described.

Figure 3:
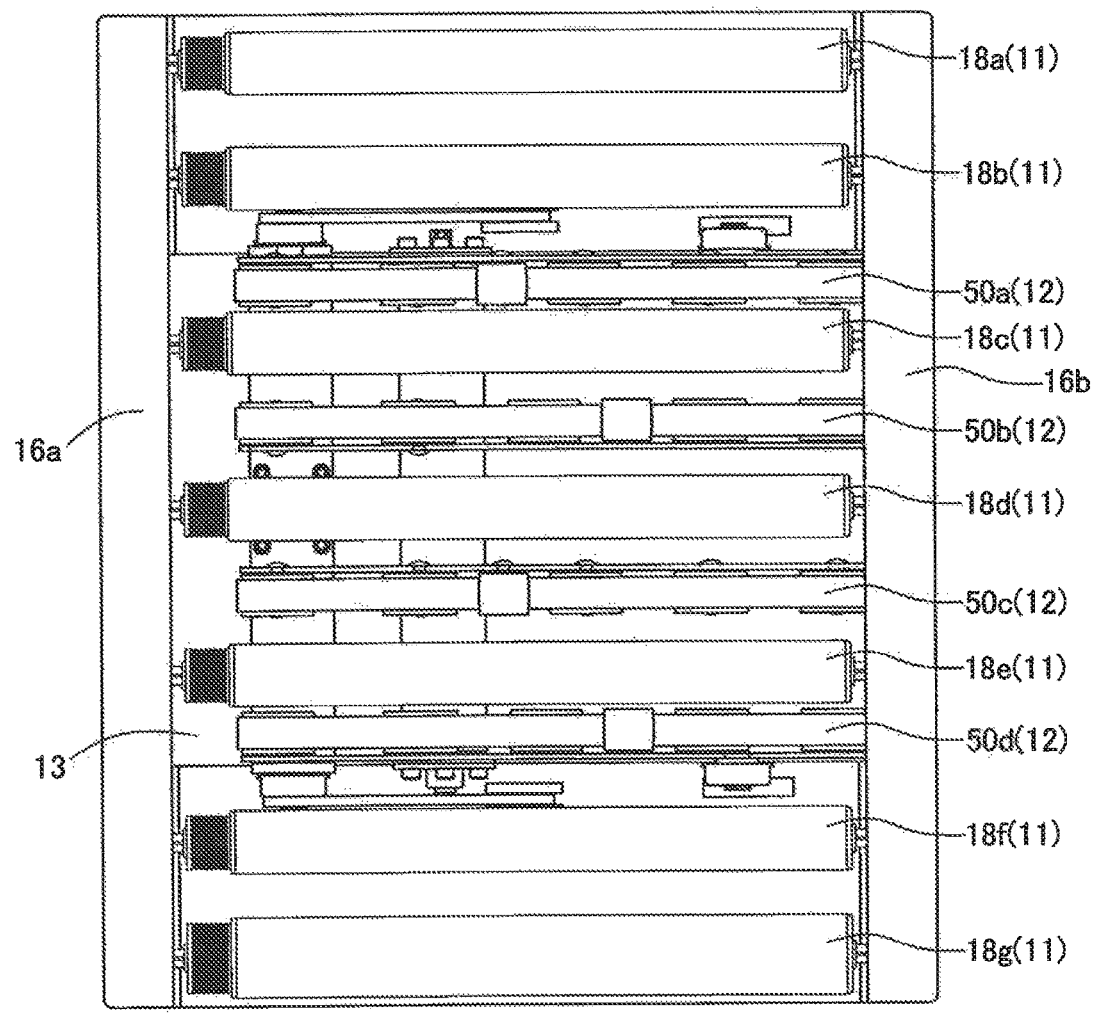
FIG. 3 is a plan view of the conveying device of FIG. 2.

As illustrated in FIG. 3, the base part 13, the sub conveyor unit 12, and the main conveyor unit 11 overlap with each other in the height direction, and are located in a common region (fixed region) in plan view. In other words, the base part 13, the sub conveyor unit 12, and the main conveyor unit 11 are formed in such a superposition region as to be superimposed with each other.

As illustrated in FIG. 3, each of the conveyors 50a to 50d of the sub conveyor unit 12 is located between any of the rollers 18a to 18g of the main conveyor unit 11. That is, respective upper parts of the conveyors 50a to 50d are not blocked by the rollers 18a to 18g, and are opened. In other words, the conveyors 50a to 50d of the sub conveyor unit 12 are always put between the rollers 18a to 18g of the main conveyor unit 11.

The conveyor 50a of this embodiment is disposed between the roller 18b and the roller 18c. Similarly, the conveyors 50b to 50d are disposed between the roller 18c and the roller 18d, between the roller 18d and the roller 18e, and between the roller 18e and the roller 18f respectively. That is, the conveyors 50a to 50d and the rollers 18b to 18f are alternately disposed in plan view. The number of narrow conveyors is arbitrary. Therefore, for example, in a case where there are six narrow conveyors, the narrow conveyors are disposed also between the roller 18a and the roller 18b, and between the roller 18f and the roller 18g.

As illustrated in FIG. 4, the lifting and lowering motor-incorporating roller 111 is disposed below the conveyor group 25.

The conveyors 50a to 50d of the conveyor group 25 are disposed between the swinging units 54, and are mounted so as to be swingable with respect to the swinging units 54 located on both the sides.

In the conveyor group 25, the conveyors 50a to 50d are integrally fixed to the connecting frames 52, 53a, 53b.

The roller body 75 of the conveying motor-incorporating roller 51 is disposed so as to be inserted into respective cutouts 62 of the plate-like members 55, and rotatable inside the cutouts 62.

As illustrated in FIG. 12A, the short rollers 63, 63 provided in the plate-like members 55a, 55d are placed on the cam surfaces of the first cam members 116, 116, and the short rollers 85, 85 of the swinging units 54, 54 are placed on the cam surfaces of the second cam members 117, 117. Therefore, when the lifting and lowering motor-incorporating roller 111 is driven, the first cam members 116, 116 rotate together with the roller body 121, and the plate-like members 55a, 55d lift and lower by operation of the first cam members 116, 116. Additionally, the roller body 125 of the follower roller 112 rotates by the rotation of the roller body 121, and the second cam members 117, 117 also rotate with the above rotation.

Herein, the cam surfaces of the first cam members 116, 116 are larger than the cam surfaces of the second cam members 117, 117, and therefore a portion close to the first cam members 116, 116 of the conveyor group 25 largely swings compared to a portion close to the second cam members 117, 117, and are located at a higher position. At this time, the short rollers 63, 63, 85, 85 are supported while rotating on the cam members 116, 116, 117, 117, respectively.

Next, conveyance operation for conveying the conveyance object 200 will be described.

The conveyor unit 1 of this embodiment exerts an effect in a case where the conveyance object 200 is transferred from the higher-level side conveyor line 3 to the lower-level side conveyor line 2 through the connection line. Therefore, operation performed in a case where conveyance is performed with no change of the higher-level side conveyor line 3 (hereinafter, also referred to as the main conveyance operation), and operation performed in a case where the conveyance object 200 is transferred from the higher-level side conveyor line 3 to the lower-level side conveyor line 2 (hereinafter, also referred to as the sub conveyance operation) will be described. Operation of transfer from the lower-level side conveyor line 2 to the higher-level side conveyor line 3 is similar except that operation is reversed, and therefore description of this operation will be omitted.

As described above, the conveyor unit 1 of this embodiment can switch conveyance operation between the main conveyance operation and the sub conveyance operation.

In a case where the main conveyance operation for allowing the conveyance object 200 to pass through on the conveyor line 3 without changing the conveying direction is performed, the conveyance object 200 flows from the upstream side toward the downstream side in the conveying direction on the conveyor line 3 to reach the conveying device 10.

Figure 13A:
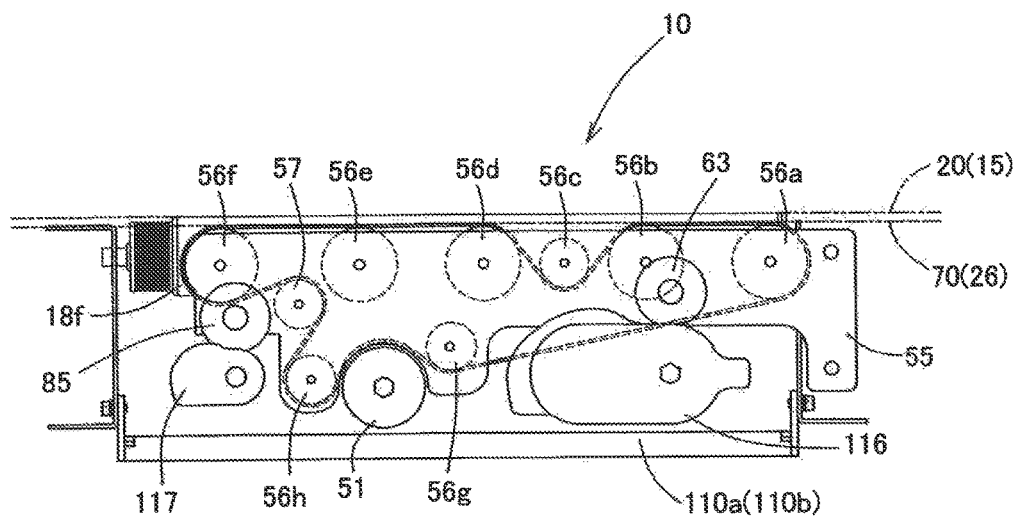
Figure 13B:
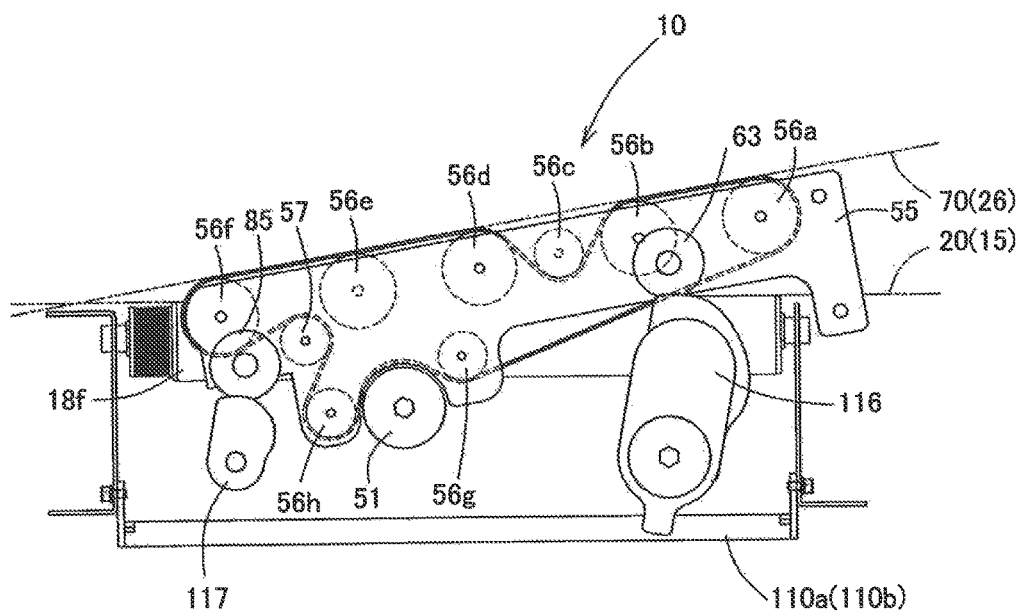

When the conveyance object 200 reaches the conveying device 10, since the conveying device 10 is in the main conveyance attitude, the main conveying surface 20 of the main conveying passage 15 is located above the sub conveying surface 70 of the sub conveying passage 26, and the conveyance object 200 cannot be in contact with the sub conveying surface 70 of the sub conveying passage 26 in principle, as illustrated in FIG. 12A and FIG. 13A. Therefore, the conveyance object 200 passes the main conveying surface 20 of the main conveying passage 15 without blocking by the sub conveying passage 26.

In a case where the sub conveyance operation for transferring from the conveyor line 3 to the other conveyor line 2 is performed, the attitude of the conveying device 10 is changed from the main conveyance attitude to the sub conveyance attitude.

Figure 10A:
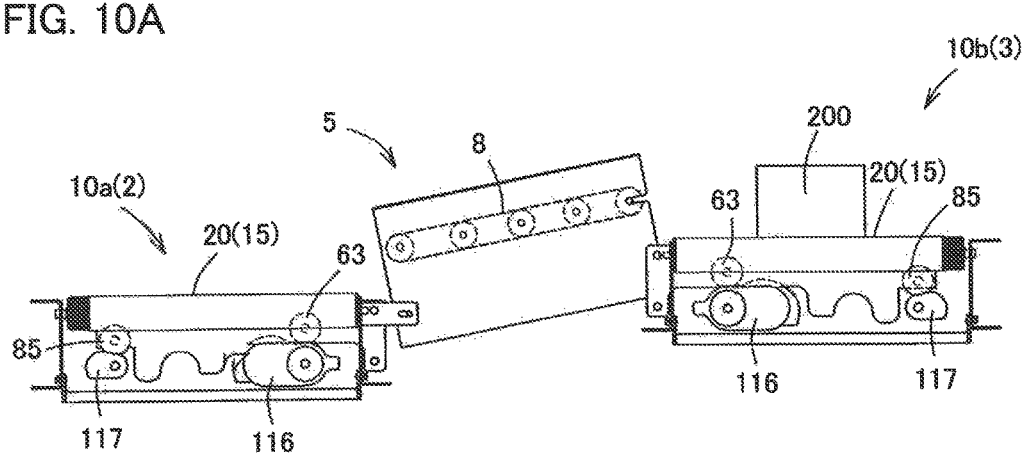

More specifically, as illustrated in FIG. 10A, the conveyance object 200 is introduced into the conveying device 10b of the conveyor line 3, and is stopped on the main conveying surface 20 of the conveying device 10b, That is, the conveyance object 200 is introduced onto the main conveying surface 20 in the main conveyance attitude in which the sub conveyor unit 12 is embedded below the main conveyor unit 11. When a sensor (not illustrated) detects that the conveyance object 200 is introduced onto the main conveying surface 20 of the conveying device 10b, rotation of the rollers 18a to 18g is stopped.

Then, when the lifting and lowering motor-incorporating roller 111 is driven to rotate, the first cam members 116, 116 mounted on the roller body 121 rotate, the attitudes of the first cam members are changed, the follower roller 112 rotates with the rotation of the lifting and lowering motor-incorporating roller 111, and the attitudes of the second cam members 117, 117 are also changed, as can be seen from FIG. 12.

The cam members 117, 117, 116, 116 that are different in size press up the short rollers 85, 85, 63, 63 of the conveyor group 25 of the sub conveyor unit 12, and therefore the conveyor group 25 is largely inclined to be brought into the inclined attitude, and is brought into the sub conveyance attitude as a whole. That is, the conveyor group 25 is inclined, and rises from spaces between the rollers 18*a* to 18*g* of the main conveyor unit 11, and protrudes upward above the rollers 18*a* to 18*g* of the main conveyor unit 11. More specifically, as illustrated in FIG. 10B, the conveyor group 25 is inclined in an attitude in which an inner part (connection conveyor line 5 side) is higher than an outer part with the connection conveyor line 5 as a reference, and the conveyance object 200 is scooped up by the sub conveying surface 70 of the conveyor group 25.

As a result, the height of an inner end of the sub conveying surface 70 of the conveyor group 25 and the height of the conveying surface 8 of the connection conveyor line 5 substantially coincide with each other with the connection conveyor line 5 as a reference, an angle difference between the sub conveying surface 70 of the conveyor group 25 and the conveying surface 8 of the connection conveyor line 5 is reduced, and both are aligned on a substantially straight line.

When the sub conveying surface 70 of the conveying device 10*b* and the conveying surface 8 of the connection conveyor line 5 extend in the conveying direction B, the sub conveying surface 70 of the conveying device 10*b* and the conveying surface 8 of the connection conveyor line 5 intersect with each other.

Figure 10B:
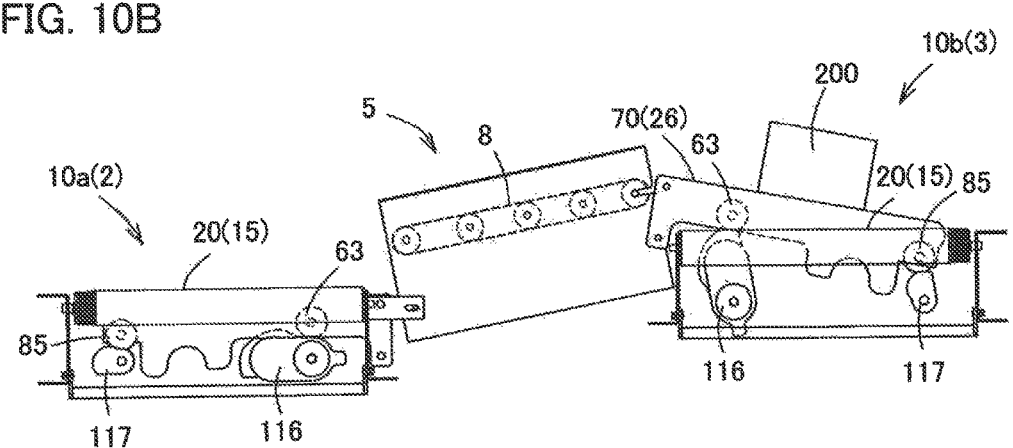

As illustrated in FIG. 10B, when the conveyance object 200 is scooped up by the sub conveying surface 70 of the conveyor group 25, the conveying motor-incorporating roller 51 is rotated, the respective belts 58 are caused to travel, and rotation of the rollers of the connection conveyor line 5 is started.

Figure 10C:
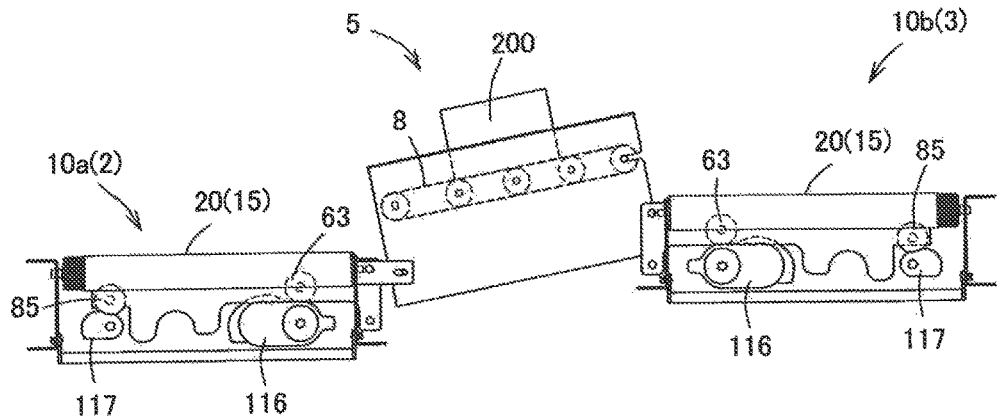

As a result, the conveyance object 200 on the sub conveyor unit 12 moves to the connection conveyor line 5 side, and is transferred to the connection conveyor line 5. That is, as illustrated in FIG. 10C, the conveyance object 200 smoothly moves from the sub conveying surface 70 of the sub conveyor unit 12 onto the conveying surface 8 of the connection conveyor line 5. Then, the conveyance object is conveyed toward the conveyor line 2 located on the obliquely lower side by the connection conveyor line 5.

Figure 11A:
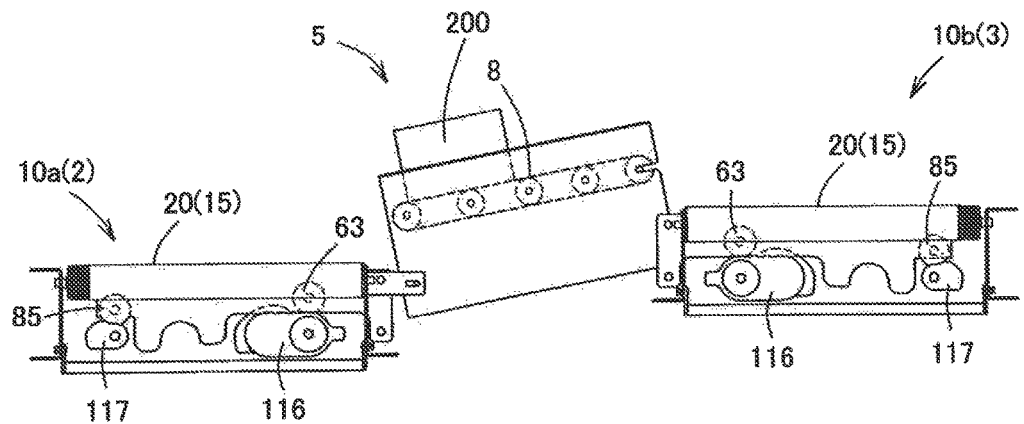
Figure 11B:
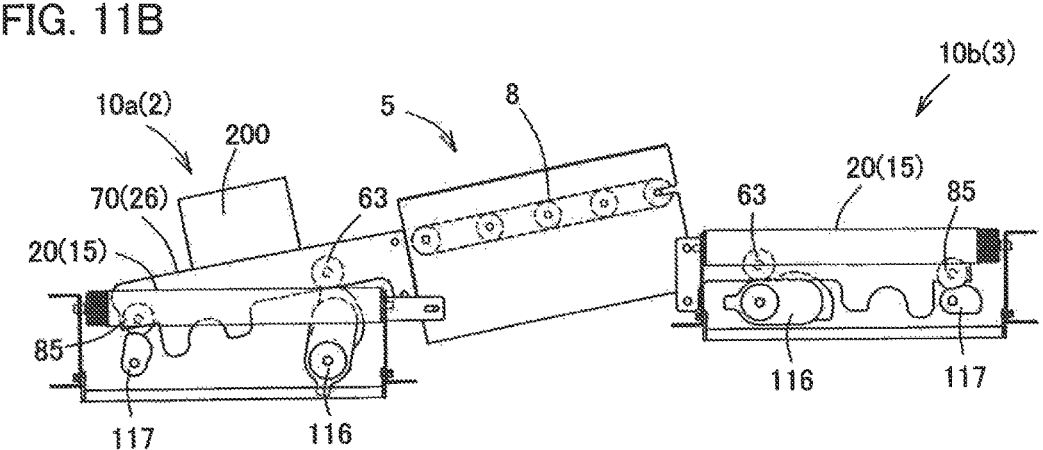

As illustrated in FIG. 11A, when the conveyance object 200 is conveyed to near the conveyor line 2. In the conveyor line 2, which is a receiving side, the lifting and lowering motor-incorporating roller 111 is rotated, and the conveyor group 25 of the sub conveyor unit 12 is protruded upward from the spaces between the rollers 18*a* to 18*g* of the main conveyor unit 11. At this time, as illustrated in FIG. 11B, also in the conveyor line 2, the sub conveying passage 26 (sub conveying surface 70) is inclined in an attitude in which the connection conveyor line 5 is on an upper side. That is, the inclined direction in the sub conveyance attitude of the conveyor line 2 during conveyance is a reversed direction from the inclined direction in the sub conveyance attitude of the conveyor line 3.

When the sub conveying surface 70 of the conveying device 10*a* in this inclined state extends in the conveying direction B, the conveying surface 8 of the connection conveyor line 5 is aligned with the sub conveying surface 70 of the conveying device 10*a*. That is, the sub conveying surface 70 of the conveying device 10*a* and the conveying surface 8 of the connection conveyor line 5 are aligned on the same plane.

In a state where the sub conveying passage 26 is inclined, the conveying motor-incorporating roller 51 is rotated to cause the belts 58 to travel.

As a result, the conveyance object 200 conveyed by the connection conveyor line 5 is smoothly received by the sub conveying surface 70 of the conveying device 10*a*, and then is transferred to the conveying device 10*a*.

Figure 11C:
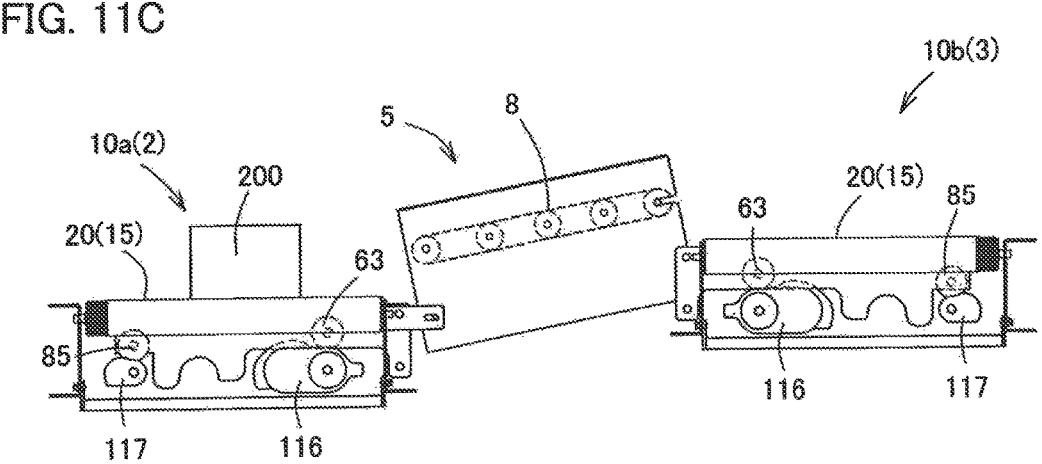

When the sensor (not illustrated) confirms that the conveyance object 200 is transferred to the conveying devices 10*a*, the lifting and lowering motor-incorporating roller 111 is rotated in the opposite direction, and an end on the connection conveyor line 5 side of the conveyor group 25 is lowered and the attitude of the sub conveyor unit 12 is returned to the main conveyance attitude which becomes horizontal, as illustrated in FIG. 11C. That is, the conveyor group 25 of the sub conveyor unit 12 sinks between the rollers 18*a* to 18*g* of the main conveyor unit 11, and the sub conveying surface 70 of the sub conveyor unit 12 is located at a lower position than the main conveying surface 20 of the main conveyor unit 11.

When the sub conveying surface 70 of the sub conveyor unit 12 becomes lower than the main conveying surface 20 of the main conveyor unit 11, the rollers 18*a* to 18*g* of the main conveyor unit 11 receive the conveyance object 200, and the conveyance object 200 is placed on the main conveying surface 20 of the main conveyor unit 11.

Then, the rollers 18*a* to 18*g* of the main conveyor unit 11 rotate, and the conveyance object 200 is conveyed to the downstream side of the conveyor line 2 along the main conveying passage 15.

The above is description of the sub conveyance operation at the time of transfer from the conveyor line 3 to the conveyor line 2.

According to the conveyor unit 1 of this embodiment, the sub conveying passage 26 of the conveying device 10 rises relative to the main conveying passage 15, and the sub conveying passage 26 forms a flow passage led to the connection conveyor line 5. Therefore, the conveyance object 200 can be transferred from the lower-level side conveyor line 2 to the higher-level side conveyor line 3, and the conveyance object 200 can be transferred from the higher-level side conveyor line 3 to the lower-level side conveyor line 2, the above conveyor lines having a height difference.

According to the conveyor unit 1 of this embodiment, the conveying devices 10 can change the attitude between the main conveyance attitude in which the main conveying surface 20 of the main conveying passage 15 is located above the sub conveying surface 70 of the sub conveying passage 26, and the sub conveyance attitude in which both the ends of the sub conveying surface 70 of the sub conveying passage 26 are located above the main conveying surface 20 of the main conveying passage 15, and the conveyance object 200 can be changeable between to an inclined slate and to a horizontal state. Therefore, the conveyor unit can be used in, for example, a picking station, so that it is possible to efficiently perform picking work.

According to the conveyor unit 1 of this embodiment, the conveying device 10 is brought into the sub conveyance attitude, so that both the ends in the conveying direction B of the sub conveying surface 70 rise by rotation of the cam members 116, 116, 117, 117, and a whole of the sub conveying surface 70 can rise up to a higher position than the main conveying surface 20. Therefore, it is possible to suppress an impact to the conveyance object 200, and it is possible to perform smooth downward conveyance.

According to the conveyor unit 1 of this embodiment, it is possible to prevent catching between the main conveying surface 20 and the conveyance object 20, and therefore it is possible to alternately convey the conveyance object 200 between the higher-level side conveyor line 3 and the lower-level side conveyor line 2 by the same kind of the conveying device 10.

According to the conveyor unit 1 of this embodiment, the lifting and lowering motor-incorporating roller 111 rotates the cam members 116, 116, 117, 117, so that the sub conveying passage 26 is inclined. Therefore, the motor of the lifting and lowering motor-incorporating roller 111 can adjust the inclination angle or the inclination speed of the sub conveying passage 26. That is, output of the lifting and lowering motor-incorporating roller 111 is adjusted, so that it is possible to adjust the inclination angle of the sub conveying surface 70 so as to reduce the relative angle with the conveying surface 8 of the connection conveyor line 5, or it is possible to slowly incline the conveyance object 200.

In the above embodiment, the main conveyor unit 11 is composed of the roller conveyor, and the sub conveyor unit 12 is the narrow belt conveyors. However, the opposite for both may be possible. That is, the roller conveyor may be the sub conveyor unit 12, and the belt conveyors may be the main conveyor unit 11.

In the above embodiment, the sub conveying surface 70 of the sub conveyor unit 12 lifts and lowers with respect to the main conveying surface 20 of the main conveyor unit 11, and is brought into the inclined state. However, the present invention is not limited to this. The main conveying surface 20 of the main conveyor unit 11 may lift and lower with respect to the sub conveying surface 70 of the sub conveyor unit 12 to be inclined.

In the above embodiment, the conveying direction B of the sub conveyor unit 12 is orthogonal to the conveying direction A of the main conveyor unit 11 in plan view. However, the present invention is not limited to this. The conveying direction B of the sub conveyor unit 12 may be the direction other than the same direction, such as the conveying direction A of the main conveyor unit 11 may be merely the intersecting direction.

In the above embodiment, the one roller 111 of the base part 13 is the motor-incorporating roller, the other roller 112 is the follower roller, and lifting and lowering is performed by the single power source. However, the present invention is not limited to this. Lifting and lowering may be performed by a plurality of power sources. For example, both the rollers 111, 112 may be the motor-incorporating rollers, and each may rotate independently to perform lifting and lowering.

In the above embodiment, the cams are employed as the lifting and lowering unit. However, a mechanism such as cranks and screws may be applied. Additionally, a solenoid may be utilized.

In the above embodiment, the conveying devices 10 are installed such that the main conveying surfaces 20 are in horizontal state. However, the present invention is not limited to this. For example, the conveying devices 10 may be installed such that the main conveying surfaces 20 are in inclined state with respect to a horizontal surface.

In the above description, the conveyance object 200 is lowered from the higher-level side conveyor line 3 to the lower-level side conveyor line 2. However, the present invention is not limited to this. The conveyance object 200 may be raised from the lower-level side conveyor line 2 to the higher-level side conveyor line 3.

In the above description, relation among the three conveyor lines, namely, the lower-level side conveyor line 2, the connection conveyor line 5, and the higher-level side conveyor line 3 is described. However, the present invention is not limited to this. The conveying devices 10 can exhibit the function only by relation between the lower-level side conveyor line 2 and the connection conveyor line 5, or relation between the connection conveyor line 5 and the higher-level side conveyor line 3.

In the above embodiment, the sub conveyance attitude of the conveying device 10b provided in the higher-level side conveyor line 3 at a time of conveyance of the conveyance object 200 from the higher-level side conveyor line 3 to the connection conveyor line 5 is the attitude of upward inclination toward the connection conveyor line 5. However, the present invention is not limited to this. For example, as illustrated in FIG. 14, the sub conveyance attitude of the conveying device 10b provided in the higher-level side conveyor line 3 at a time of conveyance of the conveyance object 200 from the higher-level side conveyor line 3 to the connection conveyor line 5 may be an attitude of downward inclination toward the connection conveyor line 5.

In this case, the conveying device 10b is preferably provided such that a lower end of the sub conveying surface 70 in the sub conveyance attitude is aligned with an upper end of the conveying surface 8 of the connection conveyor line 5.

Figure 14A:
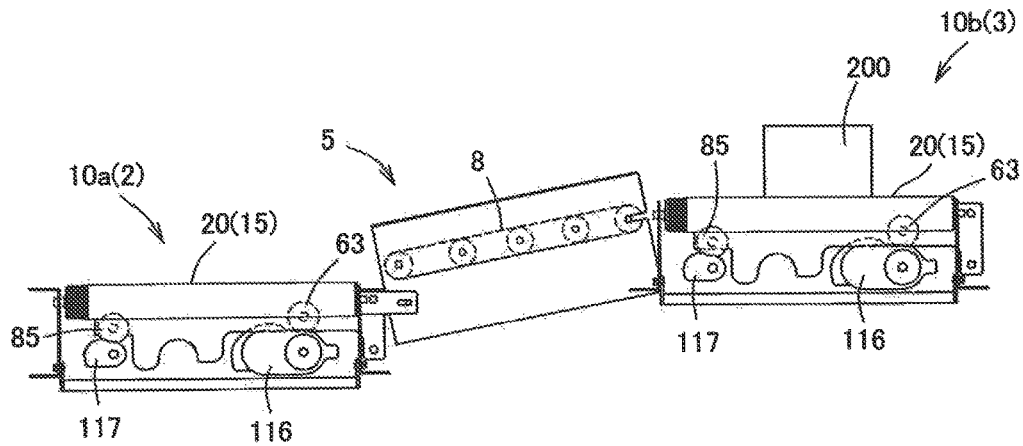
Figure 14B:
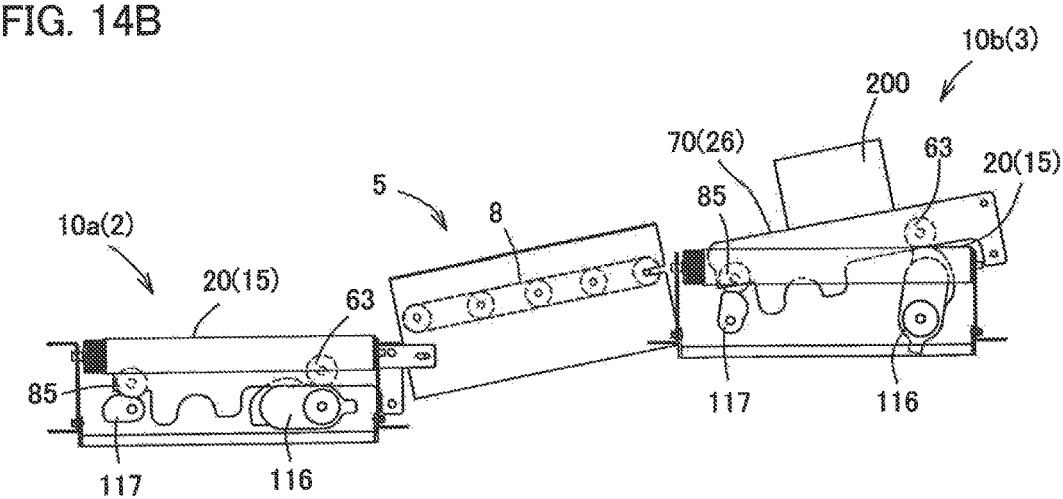
Figure 14C:
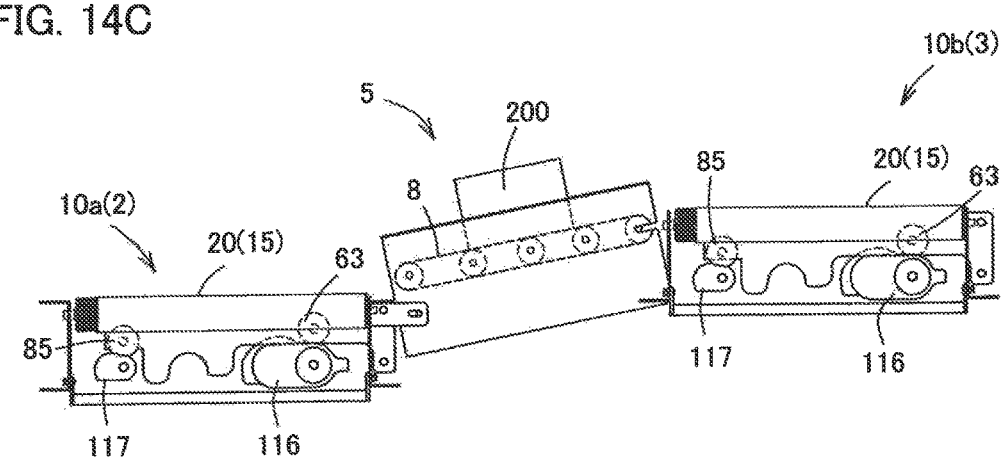

As a measure to align the lower end of the sub conveying surface 70 with the upper end of the conveying surface 8, for example, a whole of the higher-level side conveyor line 3 is installed at a higher position than the higher-level side conveyor line 3 of the first embodiment, as illustrated in FIG. 14. A relative position of the sub conveying surface 70 to the conveying surface 8 of the connection conveyor line 5 is made to be higher, the inclination angle of the connection conveyor line 5 is reduced, or a relative position of the upper end of the conveying surface 8 of the connection conveyor line 5 to the sub conveying surface 70 is made to be lower.

In the above embodiment, the motor-incorporating roller is used as the driving source. However, the present invention is not limited to this.

For example, as the driving source, simple combination of a motor and a speed reducer, combination of a motor and a power transmission mechanism (such as a gear, a chain, and a belt), a geared motor, or the like may be employed. Furthermore, fluid such as hydraulic fluid and pneumatic fluid may be employed as the driving source.

EXPLANATION OF REFERENCE SIGNS

1: conveyor unit
2: lower-level sidle conveyor line
3: higher-level side conveyor line
5: connection conveyor line
10, 10a, 10b: conveying device
11: main conveyor unit
12: sub conveyor unit
13: base part (lifting and lowering unit)
15: main conveying passage
20: main conveying surface (conveying surface of main conveying passage)
26: sub conveying passage
51: conveying motor-incorporating roller 70: sub conveying surface (conveying surface of sub conveying passage)
86: connecting member
110a, 110b: base body
111: lifting and lowering motor-incorporating roller (driving source, angle adjusting unit)
112: follower roller
116a, 116b: first cam member
117a, 117b: second cam member

The invention claimed is:

1. A conveying device comprising:
a main conveyor unit;
a sub conveyor unit; and
a lifting and lowering unit that lifts and lowers at least one of the main conveyor unit and the sub conveyor unit,
wherein the main conveyor unit comprises a main conveying passage disposed in a fixed region, the main conveying passage conveying a conveyance object,
wherein the sub conveyor unit comprises a sub conveying passage disposed in the fixed region so that the main conveying passage and sub conveying passage overlap as viewed from above the conveying device, the sub conveying passage conveying the conveyance object in an intersecting direction with respect to a conveying direction of the main conveying passage,
wherein a conveyance attitude is changeable between a main conveyance attitude in which a conveying surface of the sub conveying passage is located below a conveying surface of the main conveying passage, and a sub conveyance attitude in which both ends in the intersecting direction of the conveying surface of the sub conveying passage are located above the conveying surface of the main conveying passage, and
wherein in the sub conveyance attitude, the conveying surface of the sub conveying passage is inclined in a height direction.

2. The conveying device according to claim 1, wherein in the sub conveyance attitude, substantially a whole of the conveying surface of the main conveying passage is located below the conveying surface of the sub conveying passage.

3. The conveying device according to claim 2, wherein the lifting and lowering unit comprises at least two kinds of cam members changing the conveyance attitude from the main conveyance attitude to the sub conveyance attitude by rotation thereof.

4. The conveying device according to claim 3, wherein the lifting and lowering unit comprises a connecting member connecting the two kinds of cam members directly or through another member, the connecting member allowing a synchronizing rotation of the two kinds of cam members to change the conveyance attitude from the main conveyance attitude to the sub conveyance attitude.

5. The conveying device according to claim 2, wherein the lifting and lowering unit comprises a driving source that lifts and lowers one of the main conveyor unit and the sub conveyor unit, driving of the driving source changing the conveyance attitude from the main conveyance attitude to the sub conveyance attitude.

6. The conveying device according to claim 5, wherein the driving source is a motor-incorporating roller comprising a motor and a speed reducer therein.

7. The conveying device according to claim 2, further comprising an angle adjusting unit adjusting an inclination angle of the sub conveying passage in the sub conveyance attitude.

8. The conveying device according to claim 2, wherein the lifting and lowering unit comprises a base part directly or indirectly fixed to a floor or a fixed structure, the base part being connected to a part of the sub conveyor unit to regulate movement of the sub conveying passage in the conveying direction of the main conveying passage.

9. A conveyor unit comprising:
at least two conveyor lines having a height difference; and
a connection line connecting the two conveyor lines,
wherein at least one of the two conveyor lines comprises the conveying device according to claim 2 in a connection portion to the connection line.

10. A conveyor unit comprising:
a conveyor line; and
an inclined line inclined in a height direction,
wherein one of ends of the inclined line is connected to an intermediate part of the conveyor line, and
wherein the conveyor line comprises the conveying device according to claim 2 in a connection portion to the inclined line.

11. The conveying device according to claim 1, wherein the lifting and lowering unit comprises at least two kinds of cam members changing the conveyance attitude from the main conveyance attitude to the sub conveyance attitude by rotation thereof.

12. The conveying device according to claim 11, wherein the lifting and lowering unit comprises a connecting member connecting the two kinds of cam members directly or through another member, the connecting member allowing a synchronizing rotation of the two kinds of cam members to change the conveyance attitude from the main conveyance attitude to the sub conveyance attitude.

13. The conveying device according to claim 1, wherein the lifting and lowering unit comprises a driving source that lifts and lowers one of the main conveyor unit and the sub conveyor unit, driving of the driving source changing the conveyance attitude from the main conveyance attitude to the sub conveyance attitude.

14. The conveying device according to claim 13, wherein the driving source is a motor-incorporating roller comprising a motor and a speed reducer therein.

15. The conveying device according to claim 1, further comprising an angle adjusting unit adjusting an inclination angle of the sub conveying passage in the sub conveyance attitude.

16. The conveying device according to claim 1, wherein the lifting and lowering unit comprises a base part directly or indirectly fixed to a floor or a fixed structure, the base part being connected to a part of the sub conveyor unit to regulate movement of the sub conveying passage in the conveying direction of the main conveying passage.

17. A conveyor unit comprising:
at least two conveyor lines having a height difference; and
a connection line connecting the two conveyor lines,
wherein at least one of the two conveyor lines comprises the conveying device according to claim 1 in a connection portion to the connection line.

18. A conveyor unit comprising:
a conveyor line; and
an inclined line inclined in a height direction,
wherein one of ends of the inclined line is connected to an intermediate part of the conveyor line, and
wherein the conveyor line comprises the conveying device according to claim 1 in a connection portion to the inclined line.

* * * * *